US009497623B2

(12) United States Patent
Reunamaki et al.

(10) Patent No.: US 9,497,623 B2
(45) Date of Patent: Nov. 15, 2016

(54) METHOD AND APPARATUS FOR GUEST ACCESS SHARING

(75) Inventors: Jukka Pekka Reunamaki, Tampere (FI); Niko Tapani Kiukkonen, Veikkola (FI); Janne Marin, Espoo (FI); Sverre Slotte, Esbo (FI)

(73) Assignee: Nokia Technologies Oy, Espoo (FI)

( * ) Notice: Subject to any disclaimer, the term of this patent is extended or adjusted under 35 U.S.C. 154(b) by 520 days.

(21) Appl. No.: 13/481,123

(22) Filed: May 25, 2012

(65) Prior Publication Data
US 2013/0318573 A1 Nov. 28, 2013

(51) Int. Cl.
| | | |
|---|---|---|
| G06F 15/16 | (2006.01) |
| H04W 4/00 | (2009.01) |
| H04W 12/04 | (2009.01) |
| H04L 29/06 | (2006.01) |
| H04W 12/08 | (2009.01) |
| H04W 48/18 | (2009.01) |
| H04W 84/12 | (2009.01) |
| H04W 48/02 | (2009.01) |
| H04W 48/08 | (2009.01) |
| H04W 48/16 | (2009.01) |

(52) U.S. Cl.
CPC .......... *H04W 12/04* (2013.01); *H04L 63/0876* (2013.01); *H04W 12/08* (2013.01); *H04W 48/02* (2013.01); *H04W 48/08* (2013.01); *H04W 48/16* (2013.01); *H04W 48/18* (2013.01); *H04W 84/12* (2013.01)

(58) Field of Classification Search
CPC ..... H04L 63/12; H04L 63/876; G06F 21/31; G06F 21/44; H04W 12/08
See application file for complete search history.

(56) References Cited

U.S. PATENT DOCUMENTS

| | | | | |
|---|---|---|---|---|
| 7,849,499 | B2 * | 12/2010 | Gopalasetty et al. | 726/4 |
| 8,169,958 | B2 * | 5/2012 | Torres | H04W 4/02 370/329 |
| 8,532,304 | B2 * | 9/2013 | Asokan et al. | 380/284 |
| 2005/0086346 | A1 * | 4/2005 | Meyer | 709/229 |

(Continued)

FOREIGN PATENT DOCUMENTS

| | | |
|---|---|---|
| WO | WO-2007/128134 A1 | 11/2007 |
| WO | WO-2010/038114 A1 | 4/2010 |

OTHER PUBLICATIONS

Extended European Search Report for Application No. 13168882.2, dated Nov. 18, 2013.

*Primary Examiner* — Dede Zecher
*Assistant Examiner* — Abdullah Almamun
(74) *Attorney, Agent, or Firm* — Alston & Bird LLP

(57) ABSTRACT

A method, apparatus and computer program product are provided for configuring and controlling guest access sharing. In the context of a method, a method is provided that includes causing a network scan to be initiated and receiving the results of said network scan, the results comprising information regarding an access point and determining, based on the received results, whether the access point comprises two or more network interfaces. The method further includes causing a guest access sharing configuration procedure to be initiated if the access point comprises two or more network interfaces. The guest access sharing configuration procedure includes causing guest access information to be uploaded to a server. Another method is provided that includes receiving and storing guest access information, receiving a request to obtain the guest access information and causing the guest access information to be provided to a device if the device has permission to access it.

15 Claims, 5 Drawing Sheets

(56) References Cited

U.S. PATENT DOCUMENTS

| | | | |
|---|---|---|---|
| 2006/0165103 A1* | 7/2006 | Trudeau et al. | 370/401 |
| 2006/0190991 A1 | 8/2006 | Iyer | |
| 2007/0025302 A1* | 2/2007 | Zhang et al. | 370/338 |
| 2007/0255837 A1 | 11/2007 | Hassan et al. | |
| 2008/0086760 A1* | 4/2008 | Jiang et al. | 726/3 |
| 2009/0094680 A1* | 4/2009 | Gupta et al. | 726/3 |
| 2010/0146614 A1* | 6/2010 | Savoor | 726/10 |
| 2010/0161794 A1* | 6/2010 | Horn et al. | 709/224 |
| 2010/0278147 A1* | 11/2010 | Horn | H04W 36/08 370/331 |
| 2011/0235549 A1* | 9/2011 | Ahlers et al. | 370/255 |
| 2011/0299422 A1* | 12/2011 | Kim et al. | 370/253 |
| 2013/0031615 A1* | 1/2013 | Woodward et al. | 726/4 |
| 2013/0137423 A1* | 5/2013 | Das et al. | 455/426.1 |
| 2013/0170432 A1* | 7/2013 | O'Brien et al. | 370/328 |
| 2013/0201979 A1* | 8/2013 | Iyer et al. | 370/338 |

\* cited by examiner

METHOD AND APPARATUS FOR GUEST ACCESS SHARING

TECHNOLOGICAL FIELD

An example embodiment of the present invention relates generally to techniques for accessing a network and, more particularly, to a method and apparatus for guest access sharing.

BACKGROUND

Certain access points may allow a user to configure two different types of user access. For example, a user may configure one type of access for the user's main access and one for guest access. This type of configuration may allow the user to share their network connection with friends, via the guest access, without permitting them to access the user's main access network. This type of configuration may be especially popular in office environments, where a secure private network is necessary to keep employees and sensitive data safe, and an unsecured public network offers convenient access to the internet for visitors.

However, in some scenarios it may be desirable for the second network to not be unsecured, and instead only open to select permitted guests. In this case, providing the permitted guests with access credentials can be cumbersome.

BRIEF SUMMARY

A method, apparatus and computer program product are therefore provided according to an example embodiment of the present invention for sharing guest access with permitted guests. In this regard, the method, apparatus, and computer program product of one embodiment may allow a user to intuitively configure guest access sharing. The method, apparatus, and computer program of another embodiment may control guest access sharing by selectively permitting one or more devices to obtain guest access information. Thus, guest network access can be easily and automatically shared with permitted guests.

In one embodiment, a method is provided that includes causing a network scan to be initiated and receiving the results of said network scan. The results of the network scan include information regarding an access point. The method further includes determining, based on the received results, whether the access point comprises two or more network interfaces. The method also includes causing a guest access sharing configuration procedure to be initiated in an instance in which the access point comprises two or more network interfaces, wherein the guest access sharing configuration procedure comprises causing guest access information to be uploaded to a server. In a further embodiment, the guest access sharing configuration procedure also includes causing one or more approved guest identifiers to be uploaded to the server.

In another embodiment, a method is provided that includes receiving guest access information, causing the guest access information to be stored, receiving a request from a device to obtain the guest access information, determining whether the device has permission to obtain the guest access information, and causing the guest access information to be provided to the device in an instance in which the second device has permission to obtain the guest access information. In a variation on this embodiment, the method further comprises receiving one or more approved guest identifiers and causing them to be stored, wherein the request received from the device comprises information regarding the device or a user associated with the device, and wherein determining whether the device has permission to obtain the guest access information comprises determining whether the device or user corresponds to at least one approved guest identifier. In another variation on this embodiment, the method further comprises receiving one or more approved guest identifiers and causing them to be stored, wherein the request received from the device comprises information regarding the device or a user associated with the device, and wherein determining whether the device has permission to obtain the guest access information comprises causing at least a portion of the information regarding the device or the user associated with the device to be sent to an administrator device, and receiving an indication of permission or lack of permission from the administrator device.

In a further embodiment, an apparatus is provided that includes at least one processor and at least one memory including program code instructions, the at least one memory and the program code instructions being configured to, with the processor, direct the apparatus to at least cause a network scan to be initiated and receive the results of said network scan. The results comprise information regarding an access point. The apparatus of this embodiment is further directed to determine, based on the received results, whether the access point comprises two or more network interfaces and to cause a guest access sharing configuration procedure to be initiated in an instance in which the access point comprises two or more network interfaces. The guest access sharing configuration procedure comprises causing guest access information to be uploaded to a server. In a further embodiment, the guest access sharing configuration procedure also includes causing one or more approved guest identifiers to be uploaded to the server.

In another embodiment, an apparatus is provided that includes at least one processor and at least one memory including program code instructions, the at least one memory and the program code instructions being configured to, with the processor, direct the apparatus to at least receive guest access information, cause the guest access information to be stored, receive a request from a device to obtain the guest access information, determine whether the device has permission to obtain the guest access information, and cause the guest access information to be provided to the device in an instance in which the second device has permission to obtain the guest access information. In a variation on this embodiment, the apparatus is further directed to receive one or more approved guest identifiers and cause them to be stored, wherein the request received from the device comprises information regarding the device or a user associated with the device, and wherein the apparatus is directed to determine whether the device has permission to obtain the guest access information by determining whether the device or user corresponds to at least one approved guest identifier. In another variation on this embodiment, the apparatus is further directed to receive one or more approved guest identifiers and cause them to be stored, wherein the request received from the device comprises information regarding the device or a user associated with the device, and wherein the apparatus is directed to determine whether the device has permission to obtain the guest access information by causing at least a portion of the information regarding the device or the user associated with the device to be sent to an administrator device, and receiving an indication of permission or lack of permission from the administrator device.

In an even further embodiment, a computer program product is provided that includes a non-transitory computer readable medium storing program code portions therein. The computer program code instructions are configured to, upon execution, direct an apparatus to at least cause a network scan to be initiated and receive the results of said network scan. The results comprise information regarding an access point. The program code portions of this embodiment are further configured to direct the apparatus to determine, based on the received results, whether the access point comprises two or more network interfaces and to cause a guest access sharing configuration procedure to be initiated in an instance in which the access point comprises two or more network interfaces. The guest access sharing configuration procedure comprises causing guest access information to be uploaded to a server. In a further embodiment, the guest access sharing configuration procedure also includes causing one or more approved guest identifiers to be uploaded to the server.

In another embodiment, a computer program product is provided that includes a non-transitory computer readable medium storing program code portions therein. The computer program code instructions are configured to, upon execution, direct an apparatus to at least receive guest access information, cause the guest access information to be stored, receive a request from a device to obtain the guest access information, determine whether the device has permission to obtain the guest access information, and cause the guest access information to be provided to the device in an instance in which the second device has permission to obtain the guest access information. In a variation on this embodiment, the program code portions are further configured to direct the apparatus to receive one or more approved guest identifiers and cause them to be stored, wherein the request received from the device comprises information regarding the device or a user associated with the device, and wherein the apparatus is directed to determine whether the device has permission to obtain the guest access information by determining whether the device or user corresponds to at least one approved guest identifier. In another variation on this embodiment, the program code portions are further configured to direct the apparatus to receive one or more approved guest identifiers and cause them to be stored, wherein the request received from the device comprises information regarding the device or a user associated with the device, and wherein the apparatus is directed to determine whether the device has permission to obtain the guest access information by causing at least a portion of the information regarding the device or the user associated with the device to be sent to an administrator device, and receiving an indication of permission or lack of permission from the administrator device.

In a still further embodiment, an apparatus is provided that includes means for causing a network scan to be initiated and means for receiving the results of said network scan. The results of the network scan include information regarding an access point. The apparatus further includes means for determining, based on the received results, whether the access point comprises two or more network interfaces. The apparatus also includes means for causing a guest access sharing configuration procedure to be initiated in an instance in which the access point comprises two or more network interfaces, wherein the guest access sharing configuration procedure comprises causing guest access information to be uploaded to a server. In a further embodiment, the guest access sharing configuration procedure also includes causing one or more approved guest identifiers to be uploaded to the server.

In another embodiment, an apparatus is provided that includes means for receiving guest access information, means for causing the guest access information to be stored, means for receiving a request from a device to obtain the guest access information, means for determining whether the device has permission to obtain the guest access information, and means for causing the guest access information to be provided to the device in an instance in which the second device has permission to obtain the guest access information. In a variation on this embodiment, the apparatus further includes means for receiving one or more approved guest identifiers and means for causing them to be stored, wherein the request received from the device comprises information regarding the device or a user associated with the device, and wherein the means for determining whether the device has permission to obtain the guest access information comprise means for determining whether the device or user corresponds to at least one approved guest identifier. In another variation on this embodiment, the apparatus further comprises means for receiving one or more approved guest identifiers and means for causing them to be stored, wherein the request received from the device comprises information regarding the device or a user associated with the device, and wherein the means for determining whether the device has permission to obtain the guest access information comprises means for causing at least a portion of the information regarding the device or the user associated with the device to be sent to an administrator device, and means for receiving an indication of permission or lack of permission from the administrator device.

BRIEF DESCRIPTION OF THE DRAWINGS

Figure 1:
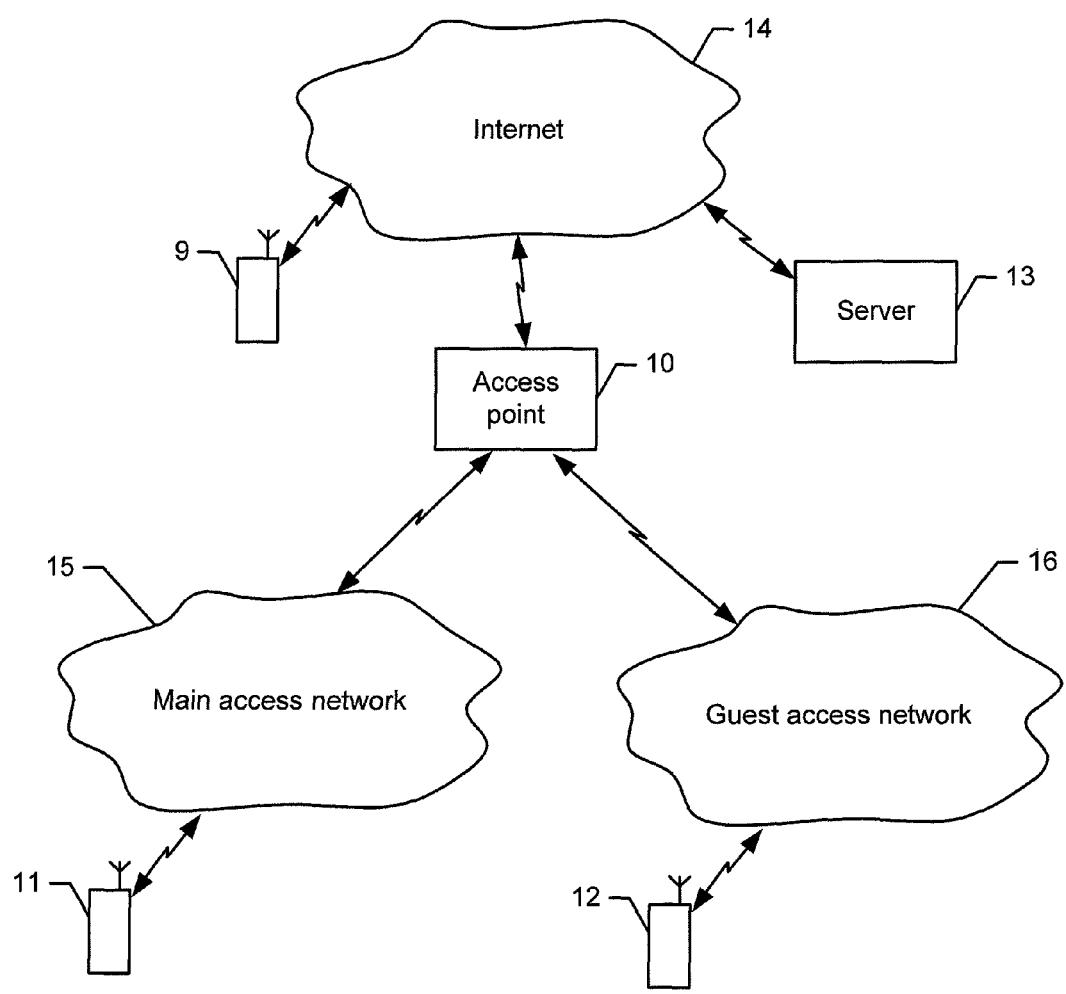
Figure 2:
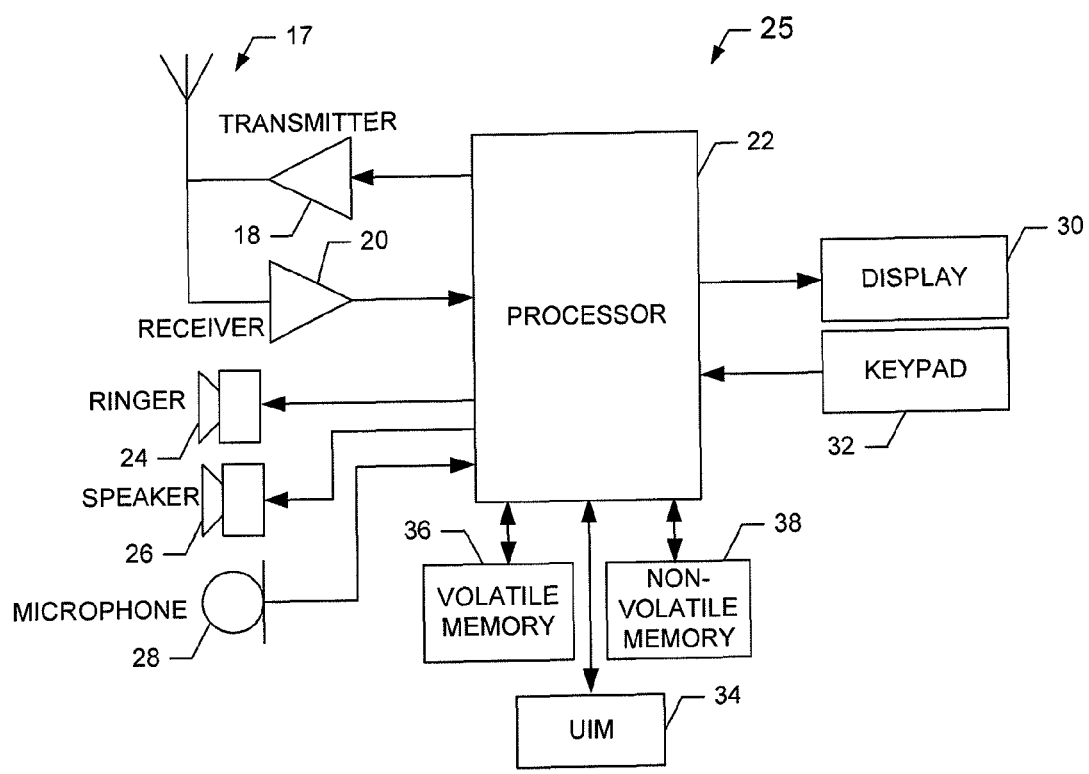
Figure 3:
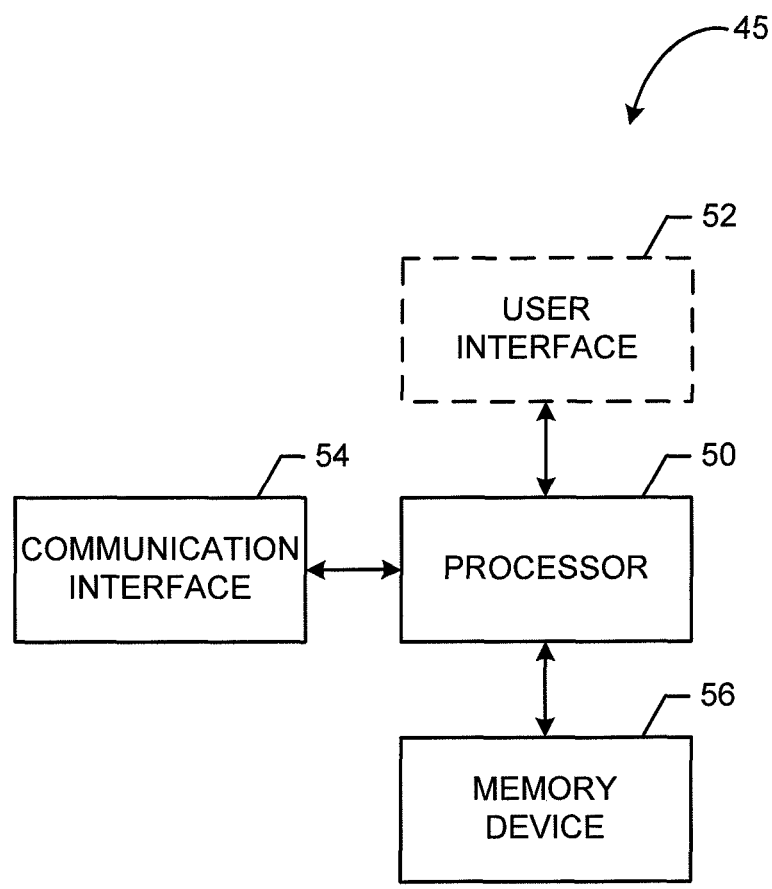
Figure 4:
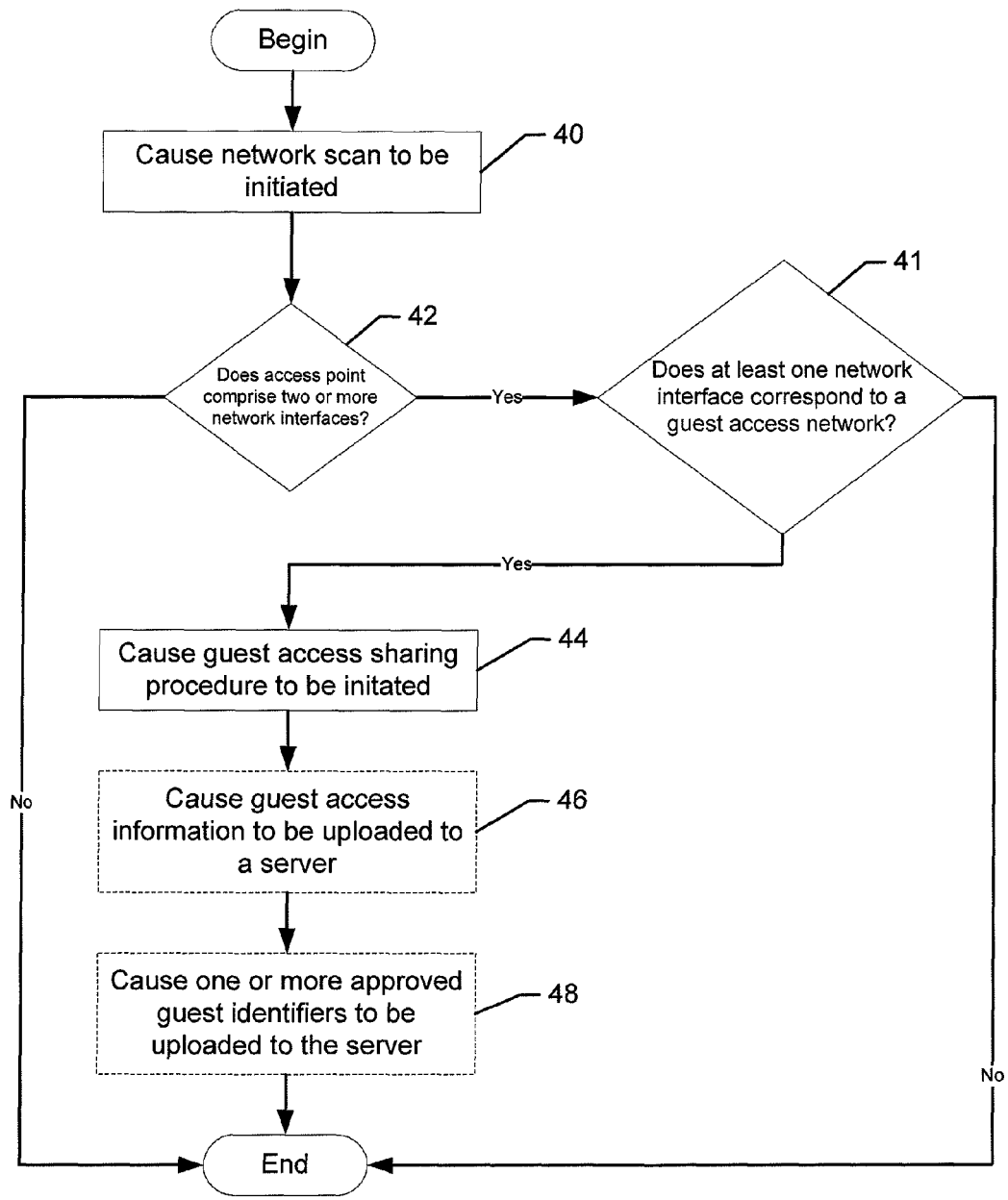
Figure 5:
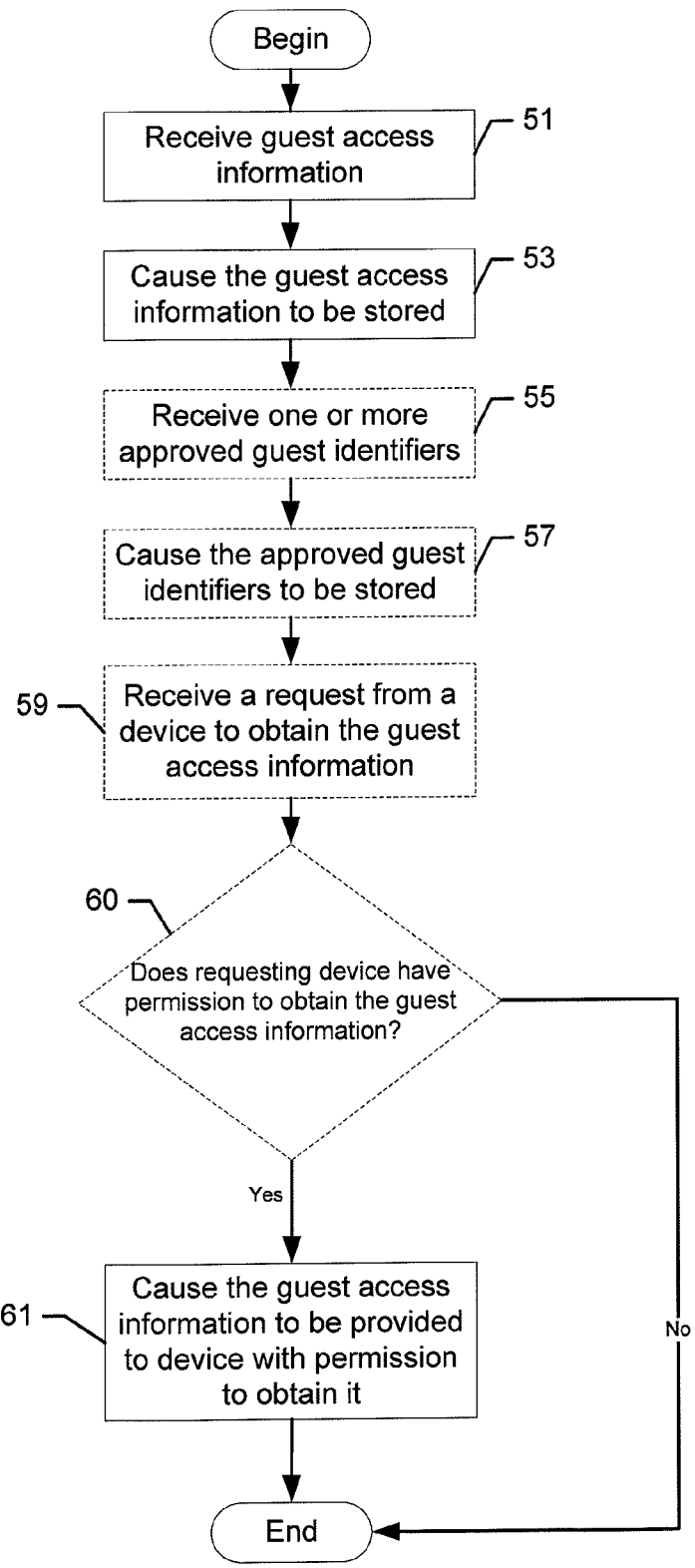

Having thus described example embodiments of the invention in general terms, reference will now be made to the accompanying drawings, which are not necessarily drawn to scale, and wherein:

FIG. 1 is a schematic representation of a system that may support example embodiments of the present invention;

FIG. 2 is a block diagram of an electronic device that may be configured to implement example embodiments of the present invention;

FIG. 3 is a block diagram of an apparatus that may be embodied by or associated with an electronic device, and may be configured to implement example embodiments of the present invention; and FIGS. 4 and 5 are flowcharts illustrating the operations performed in accordance with embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, processed and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As described below, a method, apparatus and computer program product are provided for guest access sharing. In this regard, the method, apparatus and computer program product of an example embodiment may permit a user to easily configure guest access for selected persons and/or devices. The method, apparatus, and computer program product of a corresponding embodiment allows selective access to guest access information, such as guest access credentials. Thus, the methods, apparatuses and computer program products of these embodiments may allow fast and intuitive configuration and control of guest access sharing.

FIG. 1 illustrates a block diagram of a system for configuring and controlling guest access sharing. While FIG. 1 illustrates one example of a configuration of a system for implementing this functionality, numerous other configurations may be used to implement embodiments of the present invention. With reference to FIG. 1, however, the system may include a first user device 11, a second user device 12, an access point 10, and a server 13. User devices 11 and 12 may be any device that is configured to communicate over a network. For example, user devices 11 and 12 may be mobile terminals, such as mobile telephones, PDAs, pagers, laptop computers, tablet computers, or any of numerous other hand held or portable communication devices, computation devices, content generation devices, content consumption devices, or combinations. User devices 11 and 12 may include or be associated with an apparatus 45, such as shown in FIG. 3, configured in accordance with embodiments of the present invention, as described below.

The access point 10 may be a wired or wireless access point which may provide one or more local networks, such as main access network 15 and guest access network 16, over which devices, such as devices 11 and 12, can communicate. Main access network 15 and guest access network 16 may have separate access credentials associated therewith, in order to restrict access to the networks to those devices or users with proper credentials. Access point 10 may restrict devices connected to one local network, such as guest access network 16, from communicating with devices on another local network, such as main access network 15. Thus, the local networks may be separated from one another. Access point 10 may also provide access to any number of other networks, including external networks such as the internet 14. Access point 10 may thus allow devices, such as devices 11 and 12, which are connected to a local network, such a main access network 15 or guest access network 16, to access these other networks, including external networks such as the internet 14. The degree of access that a device has to other networks, including local networks 15 and 16 and external networks 14, may depend on which local network the device is connected to. For example access point 10 may provide device 11, connected to main access network 15, with full access to the internet 14. On the other hand, device 12, connected to guest access network 16, may have limited or otherwise restricted access to the internet 14.

Server 13 is any type of network-accessible device that includes storage. Server 13 may, for example, communicate with access point 10, device 9, device 11, and device 12 over one or more networks, such as the internet 14, and/or respective ones of main access network 15 and guest access network 16. Alternatively, server 13 may communicate directly with, or otherwise be directly associated with, such as embodied by, access point 10. Server 13 may store guest access information, such as guest access credentials, and may also store one or more lists of approved persons and/or devices. Server 13 may include or be associated with an apparatus 45, such as shown in FIG. 3, configured in accordance with embodiments of the present invention, as described below.

As shown in FIG. 1, device 11, device 12, access point 10, and server 13 may communicate with one another via associated networks. These networks may be wired or wireless networks. Devices 11 and 12, the access point 10 and server 13 may communicate with each other and the networks via wireless means such as, for example, WI-FI, BLUETOOTH, or the like, or via wired means such as Ethernet, USB (Universal Serial Bus), or the like. Moreover, main access network 15 and guest access network 16 may be any of various types of networks, such as a wired or wireless local access network (LAN/WLAN), or the like. Access point 10 may access the internet 14 via wired means, such as via fiber optic or coaxial cable, twisted-pair Ethernet cable, digital subscriber line (DSL), or by connecting with a wireless network, such as a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network.

It should be understood that FIG. 1 is a simplified illustration of various components of a system according to an embodiment of the claimed invention which are helpful for achieving an understanding of the invention. As such, FIG. 1 is not intended to illustrate every possible component which could be found in a system according to all embodiments of the claimed invention. For example, the connection between access point 10 and the internet 14 may include any number of intermediate components and/or devices, such as switches, routers, other access points, printers, secured storage devices, fixed terminals, and the like. Thus, for example, signals from the internet may be received via a wired modem which is connected to a switch which, in turn, may be connected to a plurality of access points or network devices, such as printers, secured storage, or fixed terminals. Thus, in such a case, access point 10 would represent any one of the plurality of access points being configured to provide a guest access network. Therefore, it will be understood that the particulars of the networks and the means with which the various devices and components communicate with the networks and each other are not critical to the functions of embodiments of the invention. Thus, the invention should not be construed as being limited to any particular network or system configuration.

In one embodiment, one or both of user devices 11 and 12 may be embodied by a mobile terminal. In this regard, a block diagram of a mobile terminal 25 that would benefit from embodiments of the present invention is illustrated in FIG. 2. It should be understood, however, that the mobile terminal 25 as illustrated and hereinafter described is merely illustrative of one type of user device that may benefit from embodiments of the present invention and, therefore, should not be taken to limit the scope of embodiments of the present invention. As such, although numerous types of mobile terminals, such as PDAs, mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, may readily employ embodiments of the present invention, other user devices including fixed (non-mobile) electronic devices may also employ some example embodiments.

The mobile terminal 25 may include an antenna 17 (or multiple antennas) in operable communication with a transmitter 18 and a receiver 20. The mobile terminal 25 may further include an apparatus, such as a processor 22 or other processing device (e.g., processor 50 of the apparatus of FIG. 3), which controls the provision of signals to and the receipt of signals from the transmitter 18 and receiver 20, respectively. The signals may include signaling information in accordance with the air interface standard of the applicable cellular system, and also user speech, received data and/or user generated data. In this regard, the mobile terminal 25 is capable of operating with one or more air interface standards, communication protocols, modulation types, and access types. By way of illustration, the mobile terminal 25 is capable of operating in accordance with wireless communication mechanisms. For example, mobile terminal 25 may be capable of communicating in a wireless local area network (WLAN) or other communication networks, for example in accordance with one or more of the IEEE 802.11 family of standards, such as 802.11a, b, g, or n. As an alternative (or additionally), the mobile terminal 25 may be capable of operating in accordance with any of a number of first, second, third and/or fourth-generation cellular communication protocols or the like. For example, the mobile terminal 25 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like.

In some embodiments, the processor 22 may include circuitry desirable for implementing audio and logic functions of the mobile terminal 25. For example, the processor 22 may be comprised of a digital signal processor device, a microprocessor device, and various analog to digital converters, digital to analog converters, and other support circuits. Control and signal processing functions of the mobile terminal 25 are allocated between these devices according to their respective capabilities. The processor 22 thus may also include the functionality to convolutionally encode and interleave message and data prior to modulation and transmission. The processor 22 may additionally include an internal voice coder, and may include an internal data modem. Further, the processor 22 may include functionality to operate one or more software programs, which may be stored in memory. For example, the processor 22 may be capable of operating a connectivity program, such as a conventional Web browser. The connectivity program may then allow the mobile terminal 25 to transmit and receive Web content, such as location-based content and/or other web page content, according to a Wireless Application Protocol (WAP), Hypertext Transfer Protocol (HTTP) and/or the like, for example.

The mobile terminal 25 may also comprise a user interface including an output device such as a conventional earphone or speaker 26, a ringer 24, a microphone 28, a display 30, and a user input interface, all of which are coupled to the processor 22. The user input interface, which allows the mobile terminal 25 to receive data, may include any of a number of devices allowing the mobile terminal 25 to receive data, such as a keypad 32, a touch screen display (display 30 providing an example of such a touch screen display) or other input device. In embodiments including the keypad 32, the keypad 32 may include the conventional numeric (0-9) and related keys (#, *), and other hard and soft keys used for operating the mobile terminal 25. Alternatively or additionally, the keypad 32 may include a conventional QWERTY keypad arrangement. The keypad 32 may also include various soft keys with associated functions. In addition, or alternatively, the mobile terminal 25 may include an interface device such as a joystick or other user input interface. Some embodiments employing a touch screen display, as described further below, may omit the keypad 32 and any or all of the speaker 26, ringer 24, and microphone 28 entirely. The mobile terminal 25 further includes a battery, such as a vibrating battery pack, for powering various circuits that are required to operate the mobile terminal 25, as well as optionally providing mechanical vibration as a detectable output.

The mobile terminal 25 may further include a user identity module (UIM) 34. The UIM 34 is typically a memory device having a processor built in. The UIM 34 may include, for example, a subscriber identity module (SIM), a universal integrated circuit card (UICC), a universal subscriber identity module (USIM), a removable user identity module (R-UIM), etc. The UIM 34 typically stores information elements related to a mobile subscriber. In addition to the UIM 34, the mobile terminal 25 may be equipped with memory. For example, the mobile terminal 25 may include volatile memory 36, such as volatile Random Access Memory (RAM) including a cache area for the temporary storage of data. The mobile terminal 15 may also include other non-volatile memory 38, which may be embedded and/or may be removable. The memories may store any of a number of pieces of information, and data, used by the mobile terminal 15 to implement the functions of the mobile terminal 25.

Example embodiments of the invention will now be described with reference to FIG. 3, in which certain elements of an apparatus 45 for configuring and controlling guest access sharing are depicted. In order to configure guest access sharing, the apparatus 45 of FIG. 3 may be employed, for example, in conjunction with either or both of the user devices 11 and 12 of FIG. 1, such as with the mobile terminal 25 of FIG. 2. However, it should be noted that the apparatus 45 of FIG. 3 may also be employed in connection with a variety of other devices, both mobile and fixed, in order to configure guest access sharing and therefore, embodiments of the present invention should not be limited to application on devices such as the mobile terminal 25 of FIG. 2. For example, the apparatus 45 may be embodied by or associated with a personal computer or other user terminal. Moreover, in some cases, the apparatus 45 may be embodied by or associated with a fixed device such as access point 10, and a user interface for configuring guest access sharing may be presented (e.g., via a server/client relationship) on a remote device such as user devices 11 or 12, e.g., the mobile terminal, based on processing that occurs at the access point 10. In order to control guest access sharing, the apparatus 45 of FIG. 3 may be employed, for example, in conjunction with server 13 of FIG. 1. However, it should be noted that the apparatus 45 of FIG. 3 may also be employed in connection with a variety of other devices, both mobile and fixed, in order to control guest access sharing.

It should also be noted that while FIG. 3 illustrates one example of a configuration of an apparatus 45 for configuring guest access sharing, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 3, the apparatus 45 for configuring guest access sharing may include or otherwise be in communication with a processor 50, a communication interface 54, and a memory device 56. As described below and as indicated by the dashed lines in FIG. 3, the apparatus 45 may also optionally include a user interface 52 in some embodiments, such as embodiments in which the apparatus 45 is embodied as a user device 11 or 12. In some embodiments, the processor 50 (and/or co-processors or any other processing circuitry assisting or otherwise associated with the processor 50) may be in communication with the memory device 56 via a bus for passing information among components of the apparatus 45. The memory device 56 may include, for example, one or more volatile and/or nonvolatile memories. In other words, for example, the memory device 56 may be an electronic storage device (e.g., a computer readable storage medium) comprising gates configured to store data (e.g., bits) that may be retrievable by a machine (e.g., a computing device like the processor 50). In the embodiment in which the apparatus 45 is embodied as a mobile terminal 25, the memory device 56 may be embodied by the memory 36, 38. The memory device 56 may be configured to store information, data, content, applications, instructions, or the like, for enabling the apparatus to carry out various functions in accordance with an example embodiment of the present invention. For example, the memory device 56 could be configured to buffer input data for processing by the processor 50. Additionally or alternatively, the memory device 56 could be configured to store instructions for execution by the processor 50.

The apparatus 45 may, in some embodiments, be embodied by or associated with a user terminal (e.g., mobile terminal 25) or a fixed communication device or computing device (e.g., access point 10) configured to employ an example embodiment of the present invention. However, in some embodiments, the apparatus 45 may be embodied as a chip or chip set. In other words, the apparatus 45 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 45 may therefore, in some cases, be configured to implement an embodiment of the present invention on a single chip or as a single "system on a chip." As such, in some cases, a chip or chipset may constitute means for performing one or more operations for providing the functionalities described herein.

The processor 50 may be embodied in a number of different ways. For example, the processor 50 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 50 may include one or more processing cores configured to perform independently. A multi-core processor may enable multiprocessing within a single physical package. Additionally or alternatively, the processor 50 may include one or more processors configured in tandem via the bus to enable independent execution of instructions, pipelining and/or multithreading. In the embodiment in which the apparatus 45 is embodied as a mobile terminal 25, the processor 50 may be embodied by the processor 22.

In an example embodiment, the processor 50 may be configured to execute instructions stored in the memory device 56 or otherwise accessible to the processor 50. Alternatively or additionally, the processor 50 may be configured to execute hard coded functionality. As such, whether configured by hardware or software methods, or by a combination thereof, the processor 50 may represent an entity (e.g., physically embodied in circuitry) capable of performing operations according to an embodiment of the present invention while configured accordingly. Thus, for example, when the processor 50 is embodied as an ASIC, FPGA or the like, the processor 50 may be specifically configured hardware for conducting the operations described herein. Alternatively, as another example, when the processor 50 is embodied as an executor of software instructions, the instructions may specifically configure the processor 50 to perform the algorithms and/or operations described herein when the instructions are executed. However, in some cases, the processor 50 may be a processor of a specific device (e.g., a mobile terminal or network entity) configured to employ an embodiment of the present invention by further configuration of the processor 50 by instructions for performing the algorithms and/or operations described herein. The processor 50 may include, among other things, a clock, an arithmetic logic unit (ALU) and logic gates configured to support operation of the processor 50.

Meanwhile, the communication interface 54 may be any means such as a device or circuitry embodied in either hardware or a combination of hardware and software that is configured to receive and/or transmit data from/to a network, such as networks 15, 16, or the internet 14, and/or any other device or module in communication with the apparatus 45. In this regard, the communication interface 54 may include, for example, an antenna (or multiple antennas) and supporting hardware and/or software for enabling communications with a wireless communication network. Additionally or alternatively, the communication interface 54 may include the circuitry for interacting with the antenna(s) to cause transmission of signals via the antenna(s) or to handle receipt of signals received via the antenna(s). In some environments, the communication interface 54 may alternatively or also support wired communication. As such, for example, the communication interface 54 may include a communication modem and/or other hardware/software for supporting communication via cable, digital subscriber line (DSL), universal serial bus (USB) or other mechanisms. In the embodiment in which the apparatus 45 is embodied as a mobile terminal 15, the communication interface 54 may be embodied by the antenna 16, transmitter 18, receiver 20 or the like.

In some embodiments, such as instances in which the apparatus 45 is embodied by a user device 11 or 12, the apparatus 45 may include a user interface 52 that may, in turn, be in communication with the processor 50 to receive an indication of a user input and/or to cause provision of an audible, visual, mechanical or other output to the user. As such, the user interface 52 may include, for example, a keyboard, a mouse, a joystick, a display, a touch screen(s), touch areas, soft keys, a microphone, a speaker, or other input/output mechanisms. Alternatively or additionally, the processor 50 may comprise user interface circuitry configured to control at least some functions of one or more user interface elements such as, for example, a speaker, ringer, microphone, display, and/or the like. The processor 50 and/or user interface circuitry comprising the processor 50 may be configured to control one or more functions of one or more user interface elements through computer program instructions (e.g., software and/or firmware) stored on a memory accessible to the processor 50 (e.g., memory device 56, and/or the like). In other embodiments, however, such as in instances in which the apparatus 45 is embodied by access point 10, the apparatus 45 may not include a user interface 52.

Before proceeding, it should be understood that, as used hereinafter, a user who is capable of configuring guest access sharing, whether through user device 11, access point 10, or any other device, such as devices 9 or 12, will be referred to as an administrator ("admin") user. As will be discussed below, there may be one or more admin users and admin privileges can be assigned and revoked, such as by other admin users or an admin user with special privileges, such as, for example, the owner of access point 10. Furthermore, devices themselves may be referred to as an admin device in an instance in which either administrator privileges are assigned on a device-by-device basis, or an admin user has verified their personal admin privileges on the device. Administrator privileges may also be inherited through connection to particular networks. For example, any device connected to main access network 15 may receive admin privileges. The assignment of admin privileges and the rights associated therewith may, for example, ultimately be configurable by the owner of the access point 10.

It should be further understood that apparatus 45 for configuring guest access sharing may be embodied by or otherwise associated with one or more admin devices. For example, apparatus 45 may be embodied by or otherwise associated with either or both of access point 10 and an admin user device, such as user devices 9, 11, or 12. Thus, the operations described below may take place at either or both of access point 10 and any of the aforementioned user devices, or be distributed between access point 10 and one or more of the user devices. For example, one or more of the functions or operations discussed below may be carried out in access point 10, but be controlled remotely via user device 11.

Referring now to FIG. 4, the operations for configuring guest access sharing are depicted. In this regard and as described below, the operations of FIG. 4 may be performed by an apparatus 45, such as shown in FIG. 3, embodied by or otherwise associated with an admin devices such as, in one embodiment, user device 11 connected to main access network 15. In addition, the operations may be performed by any admin device, such as user device 12 connected to guest access network 16 and approved as an admin, or other admin devices that are not shown. For example, the operations may be performed by an admin device connected to the internet 14, such as device 9, but not connected to either main access network 15 or guest access network 16. In this regard, the apparatus 45 may include means, such as the user interface 52, the processor 50, the communication interface 54 or the like, for causing a network scan to be initiated. See operation 40. The network scan determines whether access point 10 comprises multiple network interfaces, such that multiple networks are made available via access point 10. See operation 42. For example, in one embodiment the network scan may determine whether multiple SSIDs (Simple Session Identifications) are associated with the MAC address of access point 10. In another embodiment, such as an embodiment in which access point 10 operates in accordance with the IEEE 802.11 specification, the network scan may determine whether multiple BSSIDs (Basic SSIDs) are being used by access point 10. In this case, each BSSID may, for example, be associated with its own MAC address.

The network scan may be initiated in response to various triggers or scenarios. For instance, in one embodiment, the network scan may be initiated manually by an admin user. For example, in embodiments in which apparatus 45 for configuring guest access sharing is embodied by admin user device 11, such as mobile terminal 25, the admin user of device 11 may initiate a network scan by providing associated user input. In another embodiment, the network scan may automatically be initiated. For example, the scan may be automatically initiated each time an admin user configures access credentials for main access network 15. In another embodiment, the scan may be automatically initiated in response to an admin user making a change to network or access properties or credentials associated with access point 10, or otherwise configures or reconfigures access point 10 or its associated networks.

After the scan is completed and the results are received by apparatus 45, if the results of the network scan indicate that access point 10 comprises more than one network interface, apparatus 45 may then determine whether at least one network interface corresponds to a guest network access. See operation 41. This may involve, for example, receiving input from a user indicating whether one or more of the detected multiple network interfaces corresponds to a guest access network, such as by receiving input via a user interface. In another embodiment, this determination may, for example, be made automatically, without relying on input from the user. If multiple network interface are detected, and at least one of the multiple network interfaces correspond to a guest access network, then a guest access sharing configuration procedure may be initiated by apparatus 45. See operations 42 and 44. The guest access sharing configuration procedure may, for example, be initiated automatically, such as in response to determining that at least one of the multiple network interfaces corresponds to a guest access network, or, according to another embodiment, be initiated in response to receiving an indication, such as from a user or via signaling.

The guest access sharing configuration procedure may include, for example, causing guest access information to be uploaded to server 13. The guest access information may, for example, include guest access credentials, which can be used to connect to guest access network 16. The guest access credentials may include passwords, user ids, keys, login information, or any other possible variation of access credentials suitable for providing access to a network. The guest access information may also include, for example, information about guest access network 16, such as the MAC address, SSID, and/or BSSID associated therewith. The guest access information may be previously stored in the memory, such as memory device 56, of an admin device. The guest access information may also be provided by an admin user, such as via user interface 52. The admin user may be prompted to provide the guest access information in response to the admin user configuring another network, such as main access network 15, associated with access point 10. The guest access information may be uploaded to server 10 automatically, e.g., without further user input, or may be guided by an admin user, such as via one or more menus and/or prompts presented, for example, via a graphical user interface. The guest access information may, for example, be uploaded from any admin device.

The guest access sharing configuration procedure may also include, for example, causing the guest access information to be stored locally, such as in memory device 56 of apparatus 45 embodied in device 11 or access point 10. In some circumstances, guest access information may already be stored locally, in which case apparatus 45 may cause some or all of this stored guest access information to be uploaded to server 13. In certain embodiments, the guest access sharing configuration procedure may include the apparatus determining, e.g., via processor 50, whether guest access sharing information is already stored locally, such as in memory device 56, in an admin device. In one embodiment, if it is determined that the guest access sharing information is not stored locally, the admin user may be prompted, such as via a graphical user interface, as to whether the admin user would like to share guest access by inputting guest access information, such as via user interface 52, and uploading it to server 13, without storing the guest access information locally. In other embodiments, the guest access information may additionally or alternatively be stored at access point 10, such as in memory device 56. In yet another embodiment, an admin device, such as device 11, may be storing credentials and the admin user may be prompted as to whether the credentials are guest access credentials. Thus, if the user indicates that they are, apparatus 45 may cause the guest access credentials to be uploaded to the server 13 as guest access information.

The guest access sharing configuration procedure may also include, for example, causing one or more approved guest identifiers to be uploaded to server 13. See operation 48. Each approved guest identifier may, for example, include or otherwise be associated with information regarding a user and/or device which an admin user wishes to permit access to the guest access information discussed above. According to an example embodiment, the approved guest identifiers may be obtained from an internal or external source. For example, the approved guest identifiers may be obtained from one or more social networks, phonebooks, contact lists, or the like, which are either stored locally or accessed remotely, such as via the internet 14. According to another example embodiment, the approved guest identifiers may be provided manually by an admin user, such as, for example, the user of device 11, via a user interface. As will be discussed further below, these approved users and/or devices will be permitted to access to the guest access information, so that they may use the guest access information to access guest access network 16. The guest access information may be sent to approved users and/or devices automatically, such as via the internet 14 or another common network, or it may be sent upon request of an approved user and/or device. The approved users and/or devices may, for example, automatically receive the guest access information in response to their being configured as an approved user, e.g., in response to their associated approved guest identifier being uploaded to server 13. According to another example embodiment, approved users and/or devices may receive the guest access information at the request of an admin user. The approved guest identifiers may be organized into groups, such as, for example, "Friends," "Family," or "Coworkers."

Thus, having described the operations of apparatus 45 for configuring guest access sharing via an admin device, the operations of apparatus 45 for controlling guest access sharing will now be described with reference to FIG. 5. In this regard and as described below, the operations of FIG. 5 may be performed by an apparatus 45, such as shown in FIG. 3, embodied by or otherwise associated with server 13. In this regard, the apparatus 45 may include means, such as user interface 52, processor 50, memory device 56, and communication interface 54 or the like, for receiving guest access information and causing the guest access information to be stored. See operations 51 and 53. In addition, the apparatus 45 may include means, such as those listed above, for receiving one or more approved guest identifiers and causing the approved guest identifiers to be stored. See operations 55 and 57.

Apparatus 45 may also include means, such as processor 50, memory device 56, and communication interface 54 or the like, for receiving a request from a device to obtain guest access information. See operation 59. The request may come, for example, from a device connected over the internet 14, such as device 9. The request may also come, for example, from a device with limited access to guest access network 16. Thus, for example, access point 10 may permit a device, such as device 12, to establish a limited connection to guest access network 16 without using guest access network access credentials. The limited connection may thus be restrained in at least one regard, but still allow device 12 to request guest access credentials from server 13. Indeed, this may be the only activity which device 12 may be permitted to perform on guest access network 16 until such time as device 12 has attained guest access credentials from server 13 and verified them with access point 10. The request may, for example, be sent manually, e.g., at the request of a user, or automatically, such as upon discovering or otherwise detecting the guest access network. In some circumstances, discovery or detection of the guest access network may be facilitated by the prior receipt of partial guest access information, such as guest access network identification information, as discussed below. The request may include information regarding the device from which the request originates and may also include information about the user of such device.

Apparatus 45 may further include means, such as processor 50 and memory device 56, for determining whether the device has permission to obtain the guest access information. See operation 60. This may be accomplished in a variety different ways. For example, in one embodiment in which approved guest identifiers have been received, apparatus 45 may compare the user and/or device information contained in the request with the approved guest identifiers. Thus, if the device from which the request originated, or the user of that device, corresponds with an approved guest identifier, the device may be determined to have permission to access the guest access information. In another example embodiment, in which approved guest identifiers are not received, apparatus 45 may prompt an admin user, such as by causing a message or signal to be sent to an admin device, to grant or deny permission. The message or signal may, for example, contain information regarding the device from which the request originated and may also contain information regarding the user of that device. Thus, for example, an admin user using an admin device may receive an alert or otherwise be prompted to provide user input indicating permission or lack of permission for a request. The prompt may be presented, for example, via a graphical user interface. An admin user may also be prompted to provide or deny permission in an instance in which approved guest identifiers are received, but a response originates from a device and/or user that is not associated with any approved guest identifiers. In this way, prompting an admin user can be an alternative to simply denying access to any requesting devices and/or users that have not been pre-approved via a corresponding approved guest identifier.

Permission to access guest access information, whether granted automatically, such as by comparing the device and/or user information with approved guest identifiers, or manually, such as by an admin user in response to a prompt, may have various limitations associated therewith. For example, in one embodiment, an admin user may configure permission to be time-limited. The time limitation may be configured by an admin user to apply, for example, for all guests, on an approved guest by approved guest basis, a group by group basis, a request by request basis, or on any other basis. Thus, for example, an admin user may wish to grant approved guest identifiers associated with a "Family" group unlimited access to guest access information, while approved guest identifiers associated with a "Friends" group is given time-limited access to the guest access information, such as for 30 minutes. Similarly, if an admin user is prompted to provide permission, such as when a request is received form a device and/or user that is not associated with an approved guest identifier, the admin user may also be prompted as to whether to grant unlimited or limited permission. In another example embodiment, the access point 10 may be configured to periodically change the guest access information so that time-limited access to the guest access information would also result in time-limited access to the guest access network.

Apparatus 45 may further include means, such as processor 50, memory device 56, and communication interface 54 or the like, for causing the guest access information to be provided to the device that requested it if the apparatus 45 has determined that the requesting device has permission to obtain the guest access information See operation 61.

As mentioned above, guest access information may also be sent to approved users and/or devices without receiving a request in some circumstances. In one embodiment, only particular guest access information may be sent absent a request. For example, a MAC address, SSID, BSSID, or the like may be sent to approved users and/or devices (either automatically, or manually, as discussed above). Thus, in this way, approved users and/or devices may more easily detect or locate the guest access network. Moreover, a request for additional guest access information may, for example, be automatically sent in response to detecting a network comprising a received MAC address, SSID, BSSID, or the like. In one embodiment, whether and what type of guest access information is sent to approved users and/or devices absent a request from a device is configurable by an admin user.

As described above, FIGS. 4 and 5 illustrate flowcharts of an apparatus 45, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 56 of an apparatus 45 employing an embodiment of the present invention and executed by a processor 50 of the apparatus 45. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or enhanced. Furthermore, in some embodiments, additional optional operations may be included. Modifications, additions, or enhancements to the operations above may be performed in any order and in any combination.

The method, apparatus 45 and computer program product described above provide many advantages. For example the method, apparatus 45 and computer program products may enable guest network access to be easily shared with friends, family, or other trusted users. In this regard, the owner of an access point can allow trusted users to access their guest access network without the owner or guest memorizing passwords or exchanging network settings. Another advantage is that the method, apparatus 45 and computer program products may enable the possibility of modifying guest network access parameters in multiple client devices. In this regard, admin permissions may be given on a user by user, device by device, network by network or another basis, opening up the possibility of configuring guest network access parameters, such as the list of approved guest identifiers, from multiple devices, enhancing convenience.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    causing a network scan to be initiated and receiving the results of said network scan, the results comprising information regarding an access point;
    determining, based on the received results, whether the access point comprises two or more network interfaces;
    causing a guest access sharing configuration procedure to be initiated in response to a determination that the access point comprises two or more network interfaces;
    receiving information regarding a device that has requested guest access;
    receiving user input indicating permission or lack of permission; and
    causing the indication of permission or lack of permission to be sent to a server, wherein the device is permitted by the server to access guest access information in an instance in which the user indicates permission for the device to obtain guest access.

2. The method of claim 1, wherein the guest access sharing configuration procedure comprises causing one or more approved guest identifiers to be uploaded to the server.

3. The method of claim 1, wherein the guest access sharing configuration procedure comprises causing the guest access information to be uploaded to the server.

4. A method comprising:
    receiving guest access information;
    causing the guest access information to be stored;
    receiving a request from a device to obtain the guest access information;
    determining whether the device has permission to obtain the guest access information by either:
        causing information regarding the device or a user associated with the device to be sent to an administrator device, and receiving an indication of permission or lack of permission from the administrator device; or
        determining whether the device or a user associated with the device is associated with one or more approved guest identifiers received from an administrator device; and
    causing the guest access information to be provided to the device in an instance in which the device has permission to obtain the guest access information.

5. The method of claim 4, further comprising receiving one or more approved guest identifiers and causing the one or more approved guest identifiers to be stored, wherein:
    causing the guest access information to be provided to the device in an instance in which the device has permission to obtain the guest access information comprises causing the guest access information to be provided to the device in an instance in which the device or a user of the device is associated with one or more of the approved guest identifiers.

6. An apparatus comprising at least one processor and at least one memory storing program instructions, the memory and program instructions being configured to, with the processor, direct the apparatus to at least:
    cause a network scan to be initiated and receive the results of said network scan, the results comprising information regarding an access point;
    determine, based on the received results, whether the access point comprises two or more network interfaces;
    cause a guest access sharing configuration procedure to be initiated in response to a determination that the access point comprises two or more network interfaces;
    receive information regarding a device that has requested guest access;
    receive user input indicating permission or lack of permission; and
    cause the indication of permission or lack of permission to be sent to a server, wherein the device is permitted by the server to access the guest access information in an instance in which the user indicates permission for the device to obtain guest access.

7. The apparatus of claim 6, wherein the guest access sharing configuration procedure further comprises causing one or more approved guest identifiers to be uploaded to the server.

8. The apparatus of claim 6, wherein the guest access sharing configuration procedure comprises causing the guest access information to be uploaded to the server.

9. An apparatus comprising at least one processor and at least one memory storing program instructions, the memory and program instructions being configured to, with the processor, direct the apparatus to at least:
    receive guest access information;
    cause the guest access information to be stored;
    receive a request from a device to obtain the guest access information;
    determine whether the device has permission to obtain the guest access information by either:
        causing information regarding the device or a user associated with the device to be sent to an administrator device, and receiving an indication of permission or lack of permission from the administrator device; or determining whether the device or a user associated with the device is associated with one or more approved guest identifiers received from an administrator device; and cause the guest access information to be provided to the device in an instance in which the device has permission to obtain the guest access information.

10. The apparatus of claim 9, wherein the apparatus is further directed to receive one or more approved guest identifiers and cause the one or more approved guest identifiers to be stored, wherein:

the apparatus is directed to cause the guest access information to be provided to the device in an instance in which the device or a user of the device is associated with one or more of the approved guest identifiers.

11. A computer program product comprising a non-transitory computer-readable storage medium having program code portions embodied therein, the program code portions being configured to, upon execution, direct an apparatus to at least:

cause a network scan to be initiated and receive the results of said network scan, the results comprising information regarding an access point;

determine, based on the received results, whether the access point comprises two or more network interfaces;

cause a guest access sharing configuration procedure to be initiated in response to a determination that the access point comprises two or more network interfaces;

receive information regarding a device that has requested guest access;

receive user input indicating permission or lack of permission; and cause the indication of permission or lack of permission to be sent to a server, wherein the device is permitted by the server to access the guest access information in an instance in which the user indicates permission for the device to obtain guest access.

12. The computer program product of claim 11, wherein the guest access sharing configuration procedure further comprises causing one or more approved guest identifiers to be uploaded to the server.

13. The computer program product of claim 11, wherein the guest access sharing configuration procedure comprises causing the guest access information to be uploaded to the server.

14. A computer program product comprising a non-transitory computer-readable storage medium having program code portions embodied therein, the program code portions being configured to, upon execution, direct an apparatus to at least:

receive guest access information;

cause the guest access information to be stored;

receive a request from a device to obtain the guest access information;

determine whether the device has permission to obtain the guest access information by either:

causing information regarding the device or a user associated with the device to be sent to an administrator device, and receiving an indication of permission or lack of permission from the administrator device; or determining whether the device or a user associated with the device is associated with one or more approved guest identifiers received from an administrator device; and cause the guest access information to be provided to the device in an instance in which the device has permission to obtain the guest access information.

15. The computer program product of claim 14, wherein the program code portions are further configured to, upon execution, direct the apparatus to receive one or more approved guest identifiers and cause the one or more approved guest identifiers to be stored, wherein:

the program code portions are further configured to, upon execution, direct the apparatus to cause the guest access information to be provided to the device in an instance in which the device or a user of the device is associated with one or more of the approved guest identifiers.

* * * * *